United States Patent [19]

Gregg

[11] 4,229,184
[45] Oct. 21, 1980

[54] APPARATUS AND METHOD FOR SOLAR COAL GASIFICATION

[75] Inventor: David W. Gregg, Moraga, Calif.

[73] Assignee: The United States of America as represented by the United States Department of Energy, Washington, D.C.

[21] Appl. No.: 29,962

[22] Filed: Apr. 13, 1979

[51] Int. Cl.³ .............................................. B01J 3/00
[52] U.S. Cl. ...................................... 48/62 R; 48/73; 48/77; 48/197 R; 48/202; 250/527; 126/438; 203/DIG. 1
[58] Field of Search ................ 250/527; 126/270, 271, 126/438; 203/DIG. 1, DIG. 16; 201/38, 31; 202/234, 99, 108; 48/202, 210, 197 R, 62 R, 73, 77; 252/373

[56] References Cited

U.S. PATENT DOCUMENTS

| | | | |
|---|---|---|---|
| 2,619,449 | 11/1952 | Sweetser | 48/202 |
| 2,760,920 | 8/1956 | Olsen | 202/234 |
| 3,998,205 | 12/1976 | Scragg et al. | 126/271 |
| 4,149,856 | 4/1979 | Keller | 48/202 |

FOREIGN PATENT DOCUMENTS 2715676 11/1977 Fed. Rep. of Germany ............ 48/202

Primary Examiner—Leon S. Bashore
Assistant Examiner—Michael L. Goldman
Attorney, Agent, or Firm—James E. Denny; Roger S. Gaither; Harry M. Dixon

[57] ABSTRACT

Apparatus for using focused solar radiation to gasify coal and other carbonaceous materials. Incident solar radiation is focused from an array of heliostats onto a tower-mounted secondary mirror which redirects the focused solar radiation down through a window onto the surface of a vertically-moving bed of coal, or a fluidized bed of coal, contained within a gasification reactor. The reactor is designed to minimize contact between the window and solids in the reactor. Steam introduced into the gasification reactor reacts with the heated coal to produce gas consisting mainly of carbon monoxide and hydrogen, commonly called "synthesis gas", which can be converted to methane, methanol, gasoline, and other useful products. One of the novel features of the invention is the generation of process steam at the rear surface of the secondary mirror.

15 Claims, 6 Drawing Figures

APPARATUS AND METHOD FOR SOLAR COAL GASIFICATION

BACKGROUND OF THE INVENTION

The invention described herein was made at Lawrence Livermore Laboratory in the course of, or under, Contract No. W-7405-ENG-48 between the United States Department of Energy and the University of California.

"Coal gasification" is the conversion of coal, coke, or char to gaseous products by reaction with air, oxygen, steam, carbon dioxide, or a mixture thereof. Products consist of carbon dioxide, carbon monoxide, hydrogen, methane, other gases, and liquids, depending upon the reactants employed and the temperature and pressure within the gasification reactor.

A chemical reaction basic to virtually all coal gasification methods is the reaction of char (carbon) with water (steam) to produce carbon monoxide and hydrogen. This reaction can be shown as:

$$\text{Char(C)} + H_2O(\text{steam}) \rightarrow CO + H_2$$

This highly endothermic reaction requires approximately 30 kilocalories per gram mole of reactants to drive it to completion. In general, the various coal gasification processes can be characterized by the source of heat used to drive the char-gasification reaction above. A description of conventional methods for coal gasification is given in the *McGraw-Hill Encyclopedia of Science & Technology*, 1977 Edition, Volume 3, pages 248-249 (McGraw-Hill Book Company, New York).

In recent years it has become recognized that focused solar radiation may be a practical heat source for driving the endothermic char-gasification reaction. For example, U.S. Pat. No. 3,993,458 to M. H. Antal, Jr. describes the use of focused solar radiation to gasify coal and other carbonaceous materials. In particular, Antal describes a fluidized bed reactor situated at the focus of a tower-top solar furnace. Carbonaceous material plus appropriate catalysts are introduced into the fluidized bed reactor, where they are exposed to focused solar radiation through a quartz window. Steam and other gaseous reactants are simultaneously admitted to the reactor, where they function both as chemical reactants and as the fluidizing medium. Product gases, e.g., $H_2$, $CO$, and/or $CH_4$, are withdrawn from the reactor for further processing and pipeline transmission. The primary problem with the reactor design proposed by Antal is that reactor solids (coal, ash, etc.) will unavoidably contact the window. Also, in the Antal apparatus, it is mandatory that the process utilize a fluidized bed, and does not offer the alternative of moving the coal through the reactor as a moving packed bed.

The design of central solar energy plants for electrical power generation in the kilowatt to megawatt range is described in the following references: *Solar Technology Today, A Special Report*, Electric Power Research Institute Journal, March 1978; *Recommendations for the Conceptual Design of the Barstow, California, Solar Central Receiver Pilot Plant*, Executive Summary, Sandia Laboratories, Livermore, California, Report No. SAND-77-8035, October 1977; and *Solar Thermal Test Facilities*, FOCUS, first issue 1978, available from Users Association, Suite 1507, First National Bank Building, Central and San Mateo, NE, Alberquerque, New Mexico. The preferred design for such solar energy central stations is to focus incident sunlight onto a tower top from a large field of mirrors called "heliostats". The maximum calculated equilibrium temperature at the solar focus ranges from 2600° to 2900° K. for existing solar facilities in the United States, and up to 4100° K. for the solar facility at Odeillo, France. Since coal gasification occurs at temperatures of 1100°±100° K., it is apparent that the high temperature capabilities of existing solar facilities are more than adequate for conducting solar coal gasification.

SUMMARY OF THE INVENTION

The present invention is an improved apparatus for gasifying coal and other carbonaceous materials, as for example biomass, using focused solar radiation which is not subject to the problems which beset the prior art. Specifically, the invention provides a gasification reactor capable of converting coal and other carbonaceous materials, such as biomass, municipal wastes, wood chips, separately or in combination as blends with coal, into combustible gases. The coal feed is advanced from a feed entry to establish a bed of coal moving toward a window located at the top of the reactor. The "moving bed" may be either a moving packed bed or a fluidized bed of coal. Incident solar radiation is focused by an array of primary mirrors, or heliostats, onto a secondary mirror which redirects the focused solar radiation down through a window onto the surface of a horizontally or vertically-moving bed of coal, or a fluidized bed of coal, contained within a gasification reactor. Steam introduced into the gasification reactor reacts with the heated coal to produce a product gas, consisting mainly of carbon monoxide and hydrogen, which can be converted to methane, methanol, gasoline, and other useful products. Gravitational forces keep reactor solids away from the window. Part of the process steam required in the gasification reaction is generated by using the rear surface of the secondary mirror as a water boiler. In this way, the energy absorbed on the mirror is efficiently utilized.

It is therefore an object of this invention to provide an improved apparatus for gasifying coal and other carbonaceous materials, and especially mixtures of coal and wastes.

It is particular object of this invention to provide a coal gasification apparatus wherein a vertically-moving coal bed, or a fluidized coal bed, is gasified by focused solar radiation redirected onto the upper surface of the bed by a secondary mirror, and where a portion of the required process steam is generated at the rear surface of the secondary mirror.

Another object is to provide a coal gasification reactor which can be operated in either a fluidized bed or a moving packed bed mode.

Still another object is to provide a solar coal gasification plant in which the thermal stresses and abrasion of critical optical components is minimized.

Other objects and advantages of the invention will become apparent from the following detailed description made with reference to the accompanying drawings.

DETAILED DESCRIPTION OF THE INVENTION

The present invention is a novel coal gasification apparatus intended to be mounted on a tower located at the center of an array of heliostats which focus incident solar radiation onto the tower top. The tower and the heliostat array are described fully in the references relating to solar energy plants for electric power generation, cited supra in the Background of the Invention section of this Application, and are incorporated herein by reference.

Figure 1:
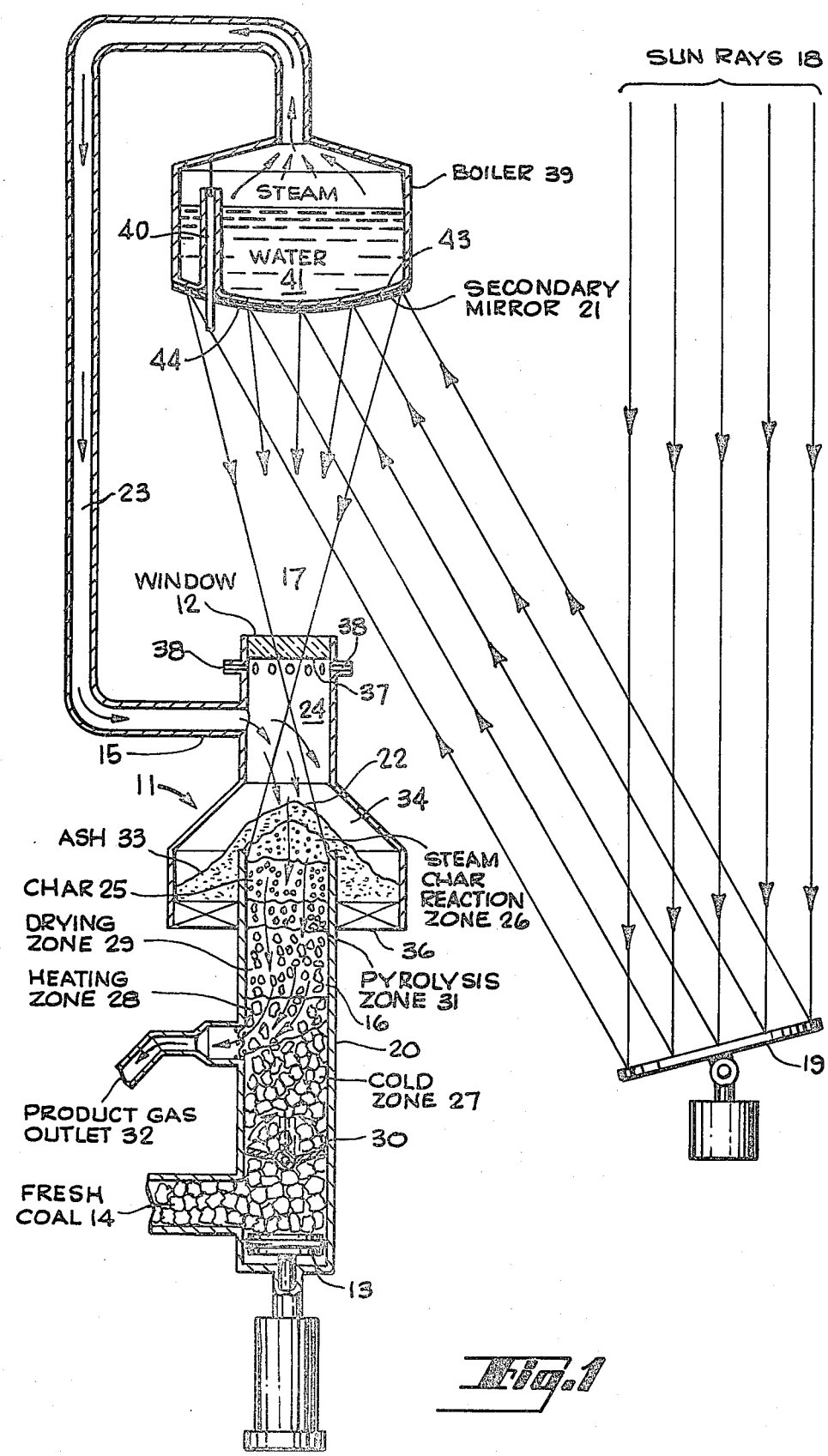
FIG. 1 is a schematic illustration of one embodiment of the apparatus, showing the principal novel features, i.e., a vertically-moving coal bed, a secondary mirror redirecting focused solar radiation from an array /of heliostats, and generation of process steam at the rear surface of the secondary mirror.

Referring now to FIG. 1, there is shown a generally cylindrical gasification reactor 11 with a top-mounted, high-temperature window 12, transparent to solar radiation. Fused quartz or fused silica is a preferred material for the window, for three reasons: (1) It is transparent to the full spectrum of solar radiation from the ultraviolet, through the visible, and into the infrared, up to a wavelength of about 4 to 5 $\mu$m; (2) Its softening temperature of 1900° K. is well above the coal gasification operating temperature of 1100°±100° K.; and (3) It is very resistant to thermal shock. Coal is introduced into the bottom of the reactor 11 by a coal feed device 13 such as a piston 13 or continuous screw conveyor. In the presently discussed packed bed reactor, any practical range of particle sizes capable of being handled in the reactor is acceptable. Coal gasification is expected to be the principal application of the present invention; however, the gasification apparatus could be used for gasifying other carbonaceous materials, particularly biomass, organic wastes, and wood industry residues, and in particular blends of coal and municipal wastes. The continuous introduction of fresh coal 14 into the bottom of the reactor creates an upwardly-moving bed 16 of coal within the reactor 11. Solar radiation 18 is collected by an array of heliostats, one of which is schematically shown as steerable primary mirror 19, and is redirected by a secondary mirror 21 as concentrated radiation 17, down through window 12 onto the upper surface 22 of the moving coal bed 16. Dry steam, indicated by arrow 23, is simultaneously introduced into the upper section 24 of the gasification reactor 11 through conduit 15. In steady-state operation, a thermal gradient is established along the moving coal bed, temperatures being highest at the top of the bed within the steam-char reaction zone 26. The coal feed rate is adjusted to match the rate of coal conversion. The steam feed rate is adjusted to match the conversion energy available from the solar flux. One way of conveniently determining the parameters is by continuously monitoring the product gas composition and deriving from these measurements the coal conversion rate. In addition, the solar radiation incident on the reactor is also monitored. The combined measurement of these two parameters permits continuous calculation and adjustment of the main process parameters.

Optimum operating conditions for the moving bed reactor can also be determined by using the computer code published in the *J. Soc. Pet. Eng.*, April 1978, pages 105–116. The relative velocities of the pyrolysis and char fronts are compared as a function of the ratio of the solar flux to the steam flux. Thus the necessary conditions for minimizing the product gas temperature can be determined from these values. Under these conditions, the energy efficiency of the process is then maximized. This is the condition where the ratio of the velocities of the pyrolysis front to the char front is at a minimum. The operator then varies the steam flow until these conditions are met for any given solar flux, keeping in mind that the solar flux is expected to change continuously during the day, and that a continual adjustment of the steam flow will be required to maintain the optimum ratio of solar flux to steam flux.

The steady-state thermal gradient stratifies the moving coal bed into zones characterized by the different chemical and physical processes occurring within the various zones of the reaction chamber 20. Starting at the bottom of the gasification reactor 11, the first region is the "cold coal" zone 27 just above the coal feed device 13 and check valve 30, wherein temperature is essentially ambient or moderately elevated above ambient. Proceeding upward through the reactor, in the direction of increasing temperature, the next region is the coal heating zone 28 with temperatures in the range of 300°–350° K. This zone merges into a zone of hot, wet coal succeeded by a "coal drying zone" 29 at temperatures in the range of 400°–500° K. It should be realized that FIG. 1 is a "snapshot" in time of steady-state operation in an upwardly-moving coal bed. Once steady-state operation is established, the position of the various zones within the gasification reactor becomes fixed, with only small movements about an equilibrium position.

The first zone involving chemical changes in the coal is the "coal pyrolysis zone" 31, with temperatures in the range of 600°–800° K. Pyrolysis chemistry simply describes the manner in which coal decomposes when heated, and can be represented as:

$$\text{Coal} + \text{heat} \rightarrow \text{char(C)} + CO + CO_2 + H_2 + CH_4 + \text{tars}.$$

The energy required for this reaction is relatively small, because these decomposition reactions are only slightly endothermic. The primary energy requirement for the pyrolysis step is that needed to heat the coal to pyrolysis temperatures. The mass liberated by pyrolysis can vary from only a few percent to as much as 40wt%, depending on the particular coal. Coal chemistry relevant to these processes, and also decomposition parameters, are discussed in detail by H. H. Lowry, Ed., in *Chemistry of Coal Utilization,* Wiley, N.Y., 1963.

As indicated above in the pyrolysis reaction, one of the products of coal pyrolysis is "char" which is essentially carbon. Char 25 is the solid reactant in the "steam-char reaction zone" 26 wherein the coal gasification reaction occurs. As mentioned previously, the coal gasification reaction takes place in the temperature range of 1100°±100° K., and requires approximately 30 kilocalories per mole of reactants to drive it to completion. The reaction of char (carbon) with water (steam) at temperatures of 1100°±100° K. produces mainly carbon monoxide (CO) and hydrogen ($H_2$). This mixture of CO and $H_2$ is withdrawn from the gasification reactor via conduit 32 designated "product", the product conduit connecting with the reactor at the level of the coal-heating zone 28.

The solid residue of the "steam-char" reaction is an ash composed mainly of inorganic oxides. The ash forms a layer 33 on top of coal bed 16, from where it continuously slides into annular ash trap 34. The ash is periodically removed from the gasification reactor through ash-removal ports 36, which permits keeping the reactor environment closed to prevent escape of steam, for example via a lock hopper (not shown). The residual heat in the ash can be transferred to incoming steam by circulating the process water or the steam through the ash trap. The upper layer 33 also includes char. The solar radiation 17 is primarily deposited into this layer and transferred to the lower zones by contact and movement with the steam flow from inlet 15. Steam is normally sufficient to effectively transport the energy down into the reaction zone; however, if it is desired to hasten transport of ash into the ash trap in order to increase exposure of char to solar radiation, mechanical means, such as rakes (not shown), can be provided to clear ash from the top of the moving bed.

As mentioned previously, quartz (fused silica) is a preferred material for the solar radiation entrance window 12. The inner surface of the entrance window is scoured and kept clean by an array of jets 38 which exhaust pure dry steam into the reactor.

One of the novel features of the present invention is a secondary mirror 21 above the gasification reactor 11. The secondary mirror, described in greater detail below, allows the use of solar radiation from a heliostat field that surrounds the tower structure (not shown) upon which the gasification reactor for a secondary mirror is mounted.

The purpose of mirror 21 is to redirect solar energy incident thereon into the reactor and concentrate it onto the top surface 22 of the moving coal bed 16. There is no requirement to bring the sunlight to a sharp focus; indeed it is desired to distribute the energy over the entire top surface, rather than any one spot. Put in other words, under steady-state conditions, the top of the moving bed is preferably positioned at a height where the sunlight-irradiated area is approximately coextensive with the exposed coal bed, or normally the reactor cross section. The requirements set forth above can be readily met by a variety of mirror geometries, which are on the whole not exacting. For example, it is possible to employ a composite mirror 21 consisting of a series of smaller flat or planar sections joined together to form a generally polygonal surface. Some of these surface segments may be absorptive rather than reflective, in order to achieve a desired balance of reflected and absorbed energy. As will be discussed below, the mirror 21 is in essence a part of the bottom of the steam boiler 39, in thermally conductive relation to the water 41. The preferred mirror structure, therefore, comprises a backing material 43 which provides the necessary structural strength to support the mechanical load thereon, coupled with good thermal conductivity, in order to transfer any heat absorbed by the mirror to the water. Appropriate metals and alloys, including steel, aluminum, and the like are suitable, copper being preferred. The bottom side of the mirror 44 is rendered reflective. In accordance with techniques well known in the art, many metals or alloys are readily machined and/or polished to high reflectivities. It is especially envisioned to deposit the backing material with a layer of nickel or chromium to enhance its reflectivity. A variety of processes, such as vapor or electrodeposition can be used to produce the required reflective coatings.

The reflective losses associated with the use of a secondary mirror are turned to advantage in the present apparatus by using otherwise "lost" energy to produce steam for the steam-char gasification reaction. This is done by using the secondary mirror 21 as the heating surface of a steam boiler 39, as shown in FIG. 1. Steam produced in the boiler is coupled into the main steam feed line 23 entering the reactor. Up to approximately 20% of the incident solar flux can be used productively for generating steam required for the steam-char gasification reaction. Neglecting scattering losses, the secondary mirror thereby becomes a nominally 100%-efficient element, the absorbed solar radiation producing steam at the top of the tower where it is needed, and the remaining reflected solar radiation directed through the entrance window into the reactor, where it drives the endothermic steam-char gasification reaction. In this manner, the reflectivity requirement for the secondary mirror is relaxed to about 80%, which can easily be achieved with conventional metal reflecting surfaces. Ordinarily, the reflectivity of mirrors will degrade with time. The fact that radiation absorbed by the mirror materials is used for producing steam permits one to delay the replacement of the mirrors until a point much later in time. Also, since the mirrors are cooled by the water 41 above the mirrors, larger fractions of absorption can be tolerated without destroying the mirrors. It will be appreciated that it is possible to adjust the absorbed fraction of solar radiation by providing absorber sections of variable cross section, disposed in the path of radiation reflected from the primary mirrors, and in heat conductive relation to the water in the boiler. The numeral 40 refers to a rod of absorbing material capable of being projected a variable distance to intercept varying amounts of solar flux for transfer to the water. Other arrangements, such as absorbing blinds disposed abutting to portions of the secondary mirror, are equally suitable.

In the reactor design shown in FIG. 1, solar radiation entering the reactor through the entrance window is absorbed directly in the layer of ash 22, which also includes exposed coal. A further advantage is that the entrance window is physically well-separated from the coal. This physical separation, in combination with the purging steam jets referred to previously, keep the entrance window clean and allow it to be maintained at a temperature well below the reaction zone temperature of $1100° \pm 100°$ K.

The steam entering the upper section 24 of the reactor flows through the reaction zone 26, which is continuously being heated by focused solar radiation beamed through the entrance window. The hot product gas (mainly a mixture of CO plus $H_2$) flows further down through the upwardly-moving column, thereby drying and pyrolyzing the coal. This downward flow of hot product gas both preheats the coal and efficiently utilizes the sensible heat in the product gas before leaving the reactor through conduit 32.

The facility can be operated with steam at atmospheric pressure. However, it is preferred to operate with steam pressures as high as the facility is able to withstand. In practice, equipment capable of withstanding up to 40 atmospheres can be economically achievable.

Figure 2:
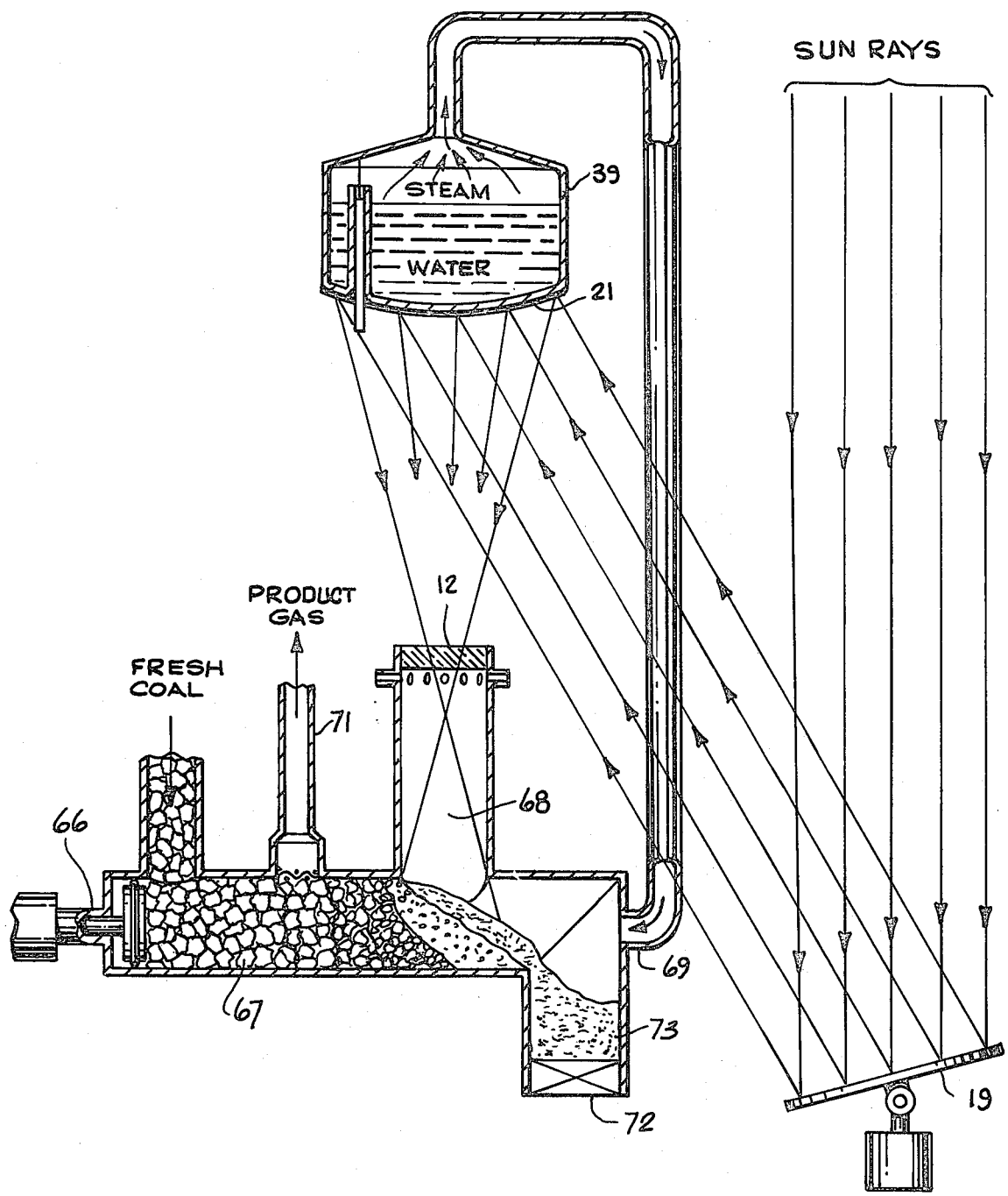
FIG. 2 shows another embodiment similar to the embodiment shown in FIG. 1, wherein horizontal coal transport is used to move the coal to a location beneath the window.

FIG. 2 shows a horizontal coal feed and ash-removal embodiment. Similarly as shown in FIG. 1, coal is fed into the reactor at the bottom, and ash is removed at the top. The general arrangement of heliostats 19, secondary mirror 21, and boiler 39, and the solar energy input section with window 12 are essentially identical to that shown in FIG. 1. The difference is the horizontal coal feed arrangement comprised of coal feed device 66 which slowly moves coal 67 beneath window 12 into contact with solar radiation 68. Steam port 69 introduces a counter current of dry steam into the reactor, which reacts with the coal and establishes zones and a temperature gradient across the reactor toward product gas removal conduit 71, similarly as shown in FIG. 1, but in a horizontal fashion. Ash 73 drops into and is removed by ash trap 72.

Figure 3:
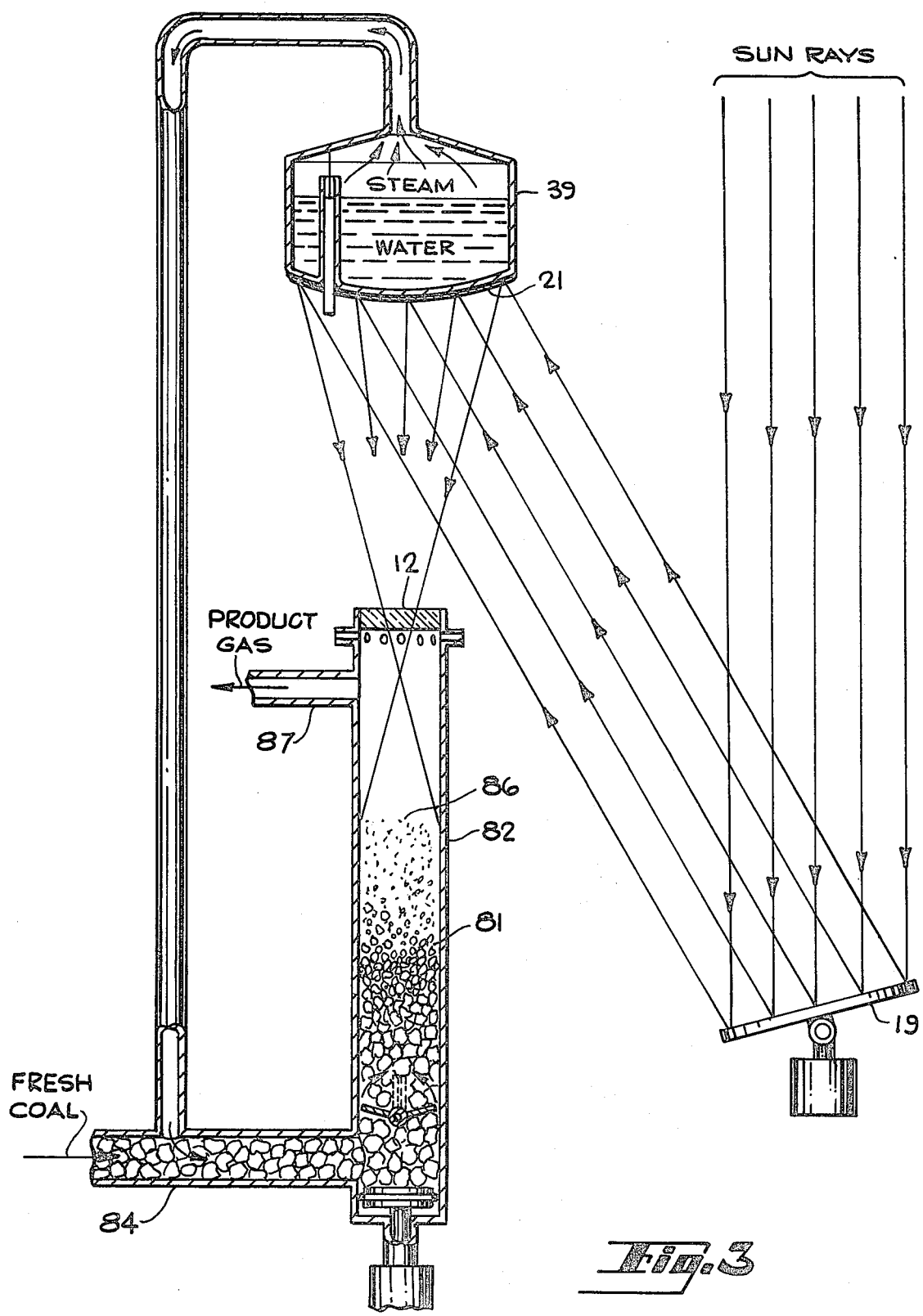
FIG. 3 is a schematic illustration of the reactor operated in a fluidized bed mode.

FIG. 3 shows the fluidized bed version of a coal gasification reactor according to the present invention. Again, heliostats 19, secondary mirror 21, and boiler 39, and the upper reactor section including window 12, are similar as in the moving packed bed reactor shown in FIG. 1. The central feature is the fluidized coal bed 81 established in the central section of the cylindrical reactor vessel 82, by forcing a mixture of finely divided coal or carbonaceous materials suspended in high velocity steam into the bottom of reactor 82 through inlet conduit 84. The technology for establishing fluidized beds, per se, is well established and documented in the literature. The inlet pressure and feed rate is adjusted to position the top 86 of the fluidized bed in the region where the solar energy is distributed over the reactor cross section. Product gas is removed through conduit 87. In this case, the ash, and under certain circumstances, ash and char, may be carried away with the product gas, and must be separated later, as for example in a cyclone separator (not shown). The quantity of char leaving the reactor with product gases is generally minimized by adjusting the height of the fluidized bed in the reactor. It is also possible to separate ash, char, and product gases by known techniques, according to their differences in density.

EXAMPLE I

This example illustrates some of the features of the moving-bed solar coal-gasification reactor shown in FIG. 1. Solar energy is absorbed on the solid (char) phase, thereby providing energy for the gasification reactions and allowing heat transfer from the solid to the steam to occur. The steam then transfers energy to the coal pyrolysis, drying, and heating zones. Powder River Basin (Wyoming) coal having a water content of 30 weight percent is the coal feed in this Example.

Operating parameters for this Example are summarized in Table I.

TABLE I

| Parameter | Amount |
|---|---|
| Coal feed rate into reactor* | 5.03 K-mol/s (76.6 kg/s) |
| Steam rate into reactor | 2.84 K-mol/s (51.12 kg/s) |
| Solar energy to raise steam to 420 K | 150 MW;** |
| Equivalent coal consumption rate to raise steam | 0.30 K-mol/s** |
| Operating temperature in reactor | 1049 K |
| Specific heat of combustion of product gas | 335 kJ/mol (377 Btu/scf) |
| Flow rate of product gas in terms of heat content | 3040 MW |

*Based on normal coal mass ratio of $C_1 H_{.85} O_{.15}$ as molecular weight.
**Additional energy required to produce steam.

The detailed operating parameters are easily determined using a computer code (see *J. Soc. Pet. Eng.*, April 1978, pages 105-116), modified to accommodate solar flux as a heat source.

Figure 4A:
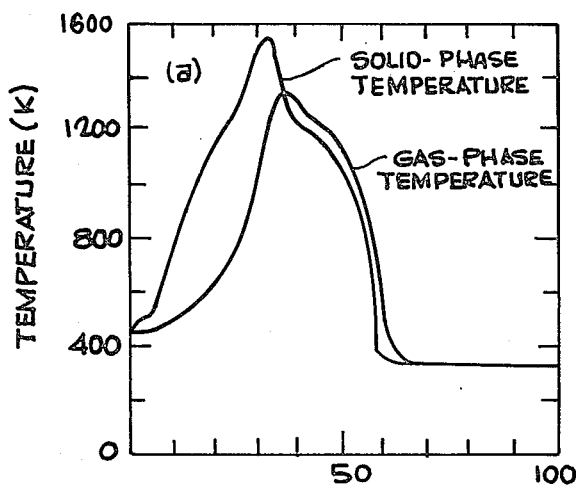
FIGS. 4(a), 4(b), and 4(c) show the results expected to be produced by a specific exemplary moving coal bed apparatus.
Figure 4B:
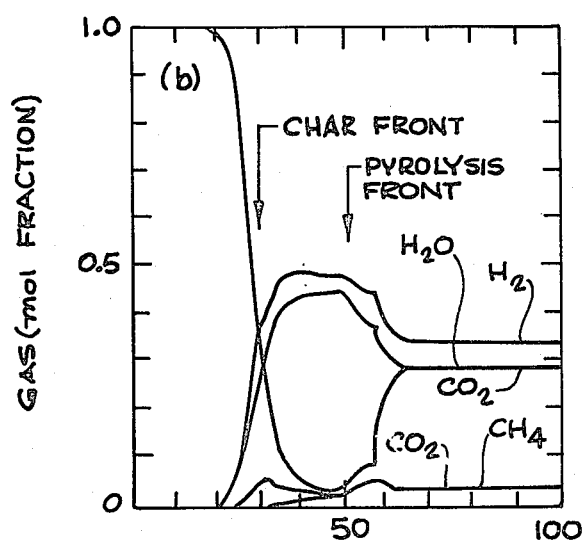

FIG. 4(a) shows a typical temperature distribution along a coal bed 100 centimeters long, extending from the coal-drying region at the right (100) to the ash layer on the left (0). At the far left, the solid (char) phase appears hotter than the gas phase. However, the gas rapidly equilibrates with the solid. FIG. 4(b) shows the typical gas compositions along the bed, and FIG. 4(c) shows the distribution of char, coal, and water in the coal along the bed length.

Figure 4C:
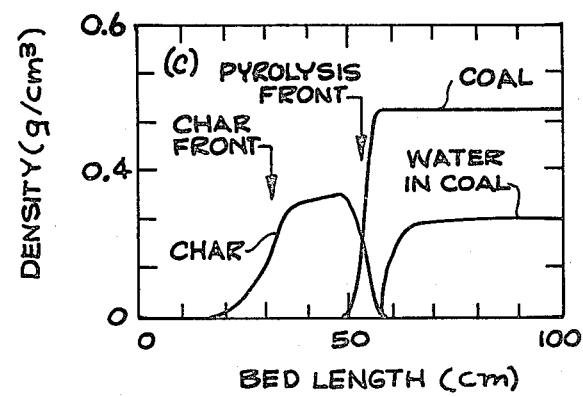

The graphs presented in FIG. 4(a), 4(b), and 4(c) are for a particular time in the development of conditions in a "fixed-bed" coal reactor. In this Example, the solar flux is 125 kJ/g-mol $H_2O$, the product-gas temperature is 420° K., and the product-gas composition (mole fraction) is as follows: $H_2O$, 0.257; $H_2$, 0.353; $CH_4$, 0.037; CO, 0.296; $CO_2$, 0.045; and tar, 0.011.

EXAMPLE II

A typical coal from Powder River Basin, Wyoming, is used in the general process described in FIG. 3. Heat loss, other than the sensible heat in the product gas which is exhausted at 500° K., is disregarded in this discussion. The results presented in Table I above are based on a 500-megawatt (thermal) heliostat field. As shown, the added energy required to produce steam can be added either by supplying additional solar energy, or by burning coal. Steam produced with solar energy in this example uses approximately 20% of the total solar-energy input. Additional solar energy, in proportion to the expected thermal efficiency, must be added to compensate for other thermal losses in the system. Operating parameters for this example are identical to those given in Table I.

The detailed process parameters of the solar fluidized-bed gasifier, as shown in FIG. 3, including the secondary mirror and generation of process steam, can be determined with an existing computer code (Report UCRL-52524, available from Technical Information Division, Lawrence Livermore Laboratory, Livermore, California).

While a preferred embodiment of the invention has been shown and described, those skilled in the art will recognize that modifications may be made therein without departing from the basic scope of the invention as defined in the following claims.

I claim:

1. A solar coal gasification apparatus comprising:
   (a) a gasification reactor comprising a reaction chamber, including means for withdrawing reaction products from said chamber;
   (b) a transparent window set in an upper surface of said gasification reactor, said window being transparent to solar radiation;
   (c) a secondary mirror having a reflective frontside and a conductive backside disposed in spaced-apart, optically communicating relation to said window;
   (d) an array of primary mirrors adapted to reflect and direct said solar radiation onto said secondary mirror, said primary and secondary mirrors being oriented to collect and redirect, solar radiation into said reaction chamber through said transparent window and concentrate said solar radiation in a reaction zone within said reactor said reaction zone being located below and spaced apart from said window; and (e) means for feeding carbonaceous materials and gaseous reactants into said reaction chamber to form a moving bed of carbonaceous material having an upper surface located in said region in spaced-apart relation to said window.

2. Claim 1, further defined in that said carbonaceous material is primarily coal.

3. The apparatus of claim 2, further defined in that said moving bed is a moving packed bed of coal.

4. The apparatus of claim 2, further defined in that said moving bed is a fluidized bed of finely divided coal, suspended by dry steam.

5. A solar coal gasification apparatus comprising:
(a) a gasification reactor comprising a reaction chamber, including means for withdrawing material produced by coal gasification from said chamber;
(b) a transparent window set in an upper surface of said gasification reactor, said window being transparent to solar radiation;
(c) a secondary mirror having a reflective frontside and a conductive backside disposed in spaced-apart, optically communicating relation to said window;
(d) an array of primary mirrors adapted to reflect and direct solar radiation into said secondary mirror, said primary and secondary mirrors being oriented to collect and redirect solar radiation into said reaction chamber through said transparent window, and concentrate said solar radiation in a reaction zone of said reactor, said reaction zone being located below and spaced apart from said window;
(e) means for feeding carbonaceous materials and gaseous reactants into said reaction chamber to form a moving bed of carbonaceous material having an upper surface located in said reaction zone in spaced-apart relation to said window;
(f) means for generating steam disposed in heat conductive relation to the backside of said secondary mirror.

6. The apparatus of claim 5, further defined in that said reaction chamber is essentially vertical, and said bed of carbonaceous material is generally moving upward through said chamber.

7. The apparatus of claim 5, further defined in that said reaction chamber is disposed horizontally.

8. The apparatus of claim 6, further defined in that said apparatus further comprises a tower, and said tower supports said secondary mirror and means for generating steam in a location generally above said window.

9. The apparatus of claim 5, further defined in that said means for generating steam is a boiler and said secondary mirror is an integral part of said boiler.

10. The apparatus of claim 9, further defined in that said secondary mirror absorbs up to 20% of the solar radiation directed thereon.

11. In a process for generating combustible gas from carbonaceous solids, the steps comprising:
(a) establishing a feed of said carbonaceous material into an enclosed reaction vessel;
(b) collecting solar radiation by a plurality of primary mirrors;
(c) concentrating and directing, by means of a secondary mirror, the solar energy reflected from said primary mirrors onto a portion of said feed of said carbonaceous material through a window disposed in said reaction vessel in spaced-apart relation to said carbonaceous material;
(d) using part of said collected solar energy to generate steam by conductive heat transfer from the backside of said secondary mirror;
(e) passing said steam through said portion of said feed material irradiated by said solar radiation, thereby generating combustible gas; and
(f) withdrawing said combustible gas from said reaction vessel.

12. The process of claim 11, further defined in that said feed of carbonaceous material is a moving packed bed.

13. The process of claim 11, further defined in that said feed of carbonaceous material is a fluidized bed suspended by means of steam.

14. The process of claim 11, further defined in that said solar radiation is directed down onto an upper portion of said feed.

15. The process of claim 11, further defined in that said carbonaceous material feed is passed through said reaction vessel and said solar energy at a rate substantially equal to the rate at which essentially all of said carbonaceous material is converted into combustible gas and ash.

* * * * *